United States Patent
Ziegler et al.

(10) Patent No.: US 6,695,116 B2
(45) Date of Patent: Feb. 24, 2004

(54) PRESSURE PLATE ASSEMBLY FOR A MULTI-DISK CLUTCH

(75) Inventors: Erwin Ziegler, Gressthal (DE); Frank Hirschmann, Niederwerrn (DE); Klaus Steinel, Bergrheinfeld (DE); Reinhold Weidinger, Unterspiesheim (DE); Wolfram Hick, Schwanfeld (DE); Norbert Lohaus, Schweinfurt (DE); Joachim Lindner, Dittelbrunn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/262,157

(22) Filed: Oct. 1, 2002

(65) Prior Publication Data

US 2003/0062240 A1 Apr. 3, 2003

(30) Foreign Application Priority Data

Oct. 1, 2001 (DE) .......................... 101 48 432

(51) Int. Cl.[7] .............................. F16D 13/71
(52) U.S. Cl. .............. 192/70.25; 192/70.19; 192/111 A
(58) Field of Search .............. 192/70.19, 70.2, 192/70.25, 111 A

(56) References Cited

U.S. PATENT DOCUMENTS

| 2,402,527 A | * | 6/1946 | Baird et al. ............. 192/70.28 |
| 3,871,499 A | * | 3/1975 | Kazuma ................. 192/70.29 |
| 5,054,597 A | * | 10/1991 | Tarlton, Sr. ............. 192/70.25 |
| 6,039,161 A | * | 3/2000 | Tanaka et al. ........... 192/70.18 |

FOREIGN PATENT DOCUMENTS

DE          37 07 918 C2     9/1988     .......... F16D/13/75

* cited by examiner

Primary Examiner—Saul Rodriguez
(74) Attorney, Agent, or Firm—Cohen, Pontani, Lieberman & Pavane

(57) ABSTRACT

A pressure plate assembly for a multi-disk clutch includes a housing arrangement, a pressure plate mounted in the housing arrangement with freedom to move in the same direction as an axis of rotation but connected to the housing with essentially no freedom of rotation and an intermediate plate mounted in the housing arrangement with freedom to move in the same direction as the axis of rotation but connected to the housing with essentially no freedom of rotation. A release distance preset arrangement for the intermediate plate includes at least one sensing element on the intermediate plate which rests on an assembly which shifts position during the performance of a releasing movement of the pressure plate. The at least one sensing element allows the intermediate plate to execute a releasing movement corresponding to the shift of this assembly. The at least one sensing element contacting the assembly is pretensioned by an intermediate plate release force-generating arrangement acting on the intermediate plate. At least one rotational coupling projection is arranged on either the intermediate plate or the housing arrangement which fits in a rotational coupling recess the other of the intermediate plate or the housing arrangement to produce a rotational coupling between the intermediate plate and the housing arrangement.

16 Claims, 5 Drawing Sheets

PRESSURE PLATE ASSEMBLY FOR A MULTI-DISK CLUTCH

BACKGROUND OF THE INVENTION

1. Field of the Invention

The present invention relates to a pressure plate assembly for a multi-disk clutch having a housing arrangement, a pressure plate mounted in the housing arrangement so that the pressure plate is axially movable with respect to the housing arrangement and fixed with respect to rotation relative to the housing arrangement, an intermediate plate mounted in the housing arrangement so that the intermediate plate is axially movable with respect to the housing arrangement and fixed with respect to rotation relative to the housing arrangement, and a release distance preset arrangement for the intermediate plate having at least one sensing element on the intermediate plate. The sensing element rests on an assembly which shifts position during the performance of a releasing movement of the pressure plate and allows the intermediate plate to execute a releasing movement corresponding to the shift of this assembly. The sensing element in contact with the assembly is pretensioned by an intermediate plate releasing force-generating arrangement which acts on the intermediate plate.

2. Description of the Related Art

A dual-disk clutch and a pressure plate assembly for such a clutch are known from German reference DE 37 07 918 C2. This dual-disk clutch includes a pressure plate and an intermediate plate which are installed in a housing and are movable in the same direction as an axis of rotation within a certain limited range with respect to the housing to execute clutch-releasing or clutch-engaging movements. Both the pressure plate and the intermediate plate are connected to the housing by so-called tangential leaf springs or groups of tangential leaf springs. At one end, the tangential leaf springs or groups of tangential leaf springs are attached to the housing. At the other end, these tangential leaf springs or groups of tangential leaf springs are attached to the pressure plate or to the intermediate plate. In these end areas, therefore, the tangential leaf springs are supported on the housing on the one side and on the pressure plate or intermediate plate on the other and thus generate the releasing force required for the execution of the clutch-release operations.

A sensing element is provided on the intermediate plate to detect a position of a group of tangential leaf springs connecting the pressure plate to the housing. More specifically, this sensing occurs in the central part of the circumferential dimension of the tangential leaf springs. The reason for this is that the central area of this group of tangential leaf springs executes a stroke which corresponds approximately to half of the stroke of the pressure plate during the execution of a releasing movement. This stroke of the central area of the tangential leaf springs equal to half the stroke of the pressure plate is then the stroke which the intermediate plate executes in response to a release movement. The sensing of this group of tangential leaf springs does not necessarily have to involve direct physical contact between the sensing element and these tangential leaf springs.

A contact element may be connected to the two support or end areas of the group of tangential leaf springs. The central area of this contact element can thus execute essentially the same stroke as that of the associated central area of the tangential leaf springs.

The pretension of the tangential leaf springs which connect the intermediate plate to the housing ensures that the intermediate plate copies the disengaging or release movement of the pressure plate in a defined manner by traveling a corresponding but reduced releasing distance. Upon the execution of a clutch-engaging operation, a stored-energy device such as, for example, a diaphragm spring then works against the tangential leaf springs of the pressure plate and the tangential leaf springs of the intermediate plate. Here, too, a corresponding reduction occurs with respect to the distance traveled between the pressure plate and the intermediate plate.

In this known pressure plate assembly or dual-disk clutch in which measures are taken to provide for a defined release movement of the intermediate plate upon execution of a clutch-release operation, there is the problem that the intermediate plate in particular may be induced to vibrate in the axial direction when it is not clamped between the two clutch disks. These axial vibrations may be transmitted to other components such as the pressure plate by the sensing element.

SUMMARY OF THE INVENTION

It is an object of the present invention to provide a pressure plate assembly for a multi-disk friction clutch which at least reduces the danger of the excitation of vibrations in the area of the intermediate plate without affecting the defined release behavior.

According to the present invention, the object is acheived by a pressure plate assembly for a multi-disk clutch having a housing arrangement, a pressure plate mounted in the housing arrangement so that the pressure plate is axially movable with respect to the housing arrangement and fixed with respect to rotation relative to the housing arrangement, an intermediate plate mounted in the housing arrangement so that the intermediate plate is axially movable with respect to the housing arrangement and fixed with respect to rotation relative to the housing arrangement, a release distance preset arrangement for the intermediate plate having at least one sensing element on the intermediate plate, wherein the sensing element rests on an assembly which shifts position during the performance of a releasing movement of the pressure plate and allows the intermediate plate to execute a releasing movement corresponding to the shift of this assembly, where the sensing element in contact with the assembly is pretensioned by an intermediate plate releasing force-generating arrangement which acts on the intermediate plate.

According to the present invention, at least one rotational coupling projection is further provided on one of the intermediate plate and the housing arrangement which fits into a rotational coupling recess in the other one of the intermediate plate and the housing arrangement, to produce a rotational coupling between the intermediate plate and housing arrangement.

In contrast to the approach known from the state of the art, the pressure plate assembly according to the present invention separates the function of producing the releasing force for the intermediate plate and the function of producing a rotational coupling of the intermediate plate to the housing arrangement. In particular, at least one rotational coupling projection is provided to produce the rotational coupling which fits into an appropriate recess and thus rests against it. The cooperation between the rotational coupling projection and the respective rotational coupling recess provides a very stable rotational coupling between the intermediate plate and the housing arrangement. The rotational coupling projection and the respective rotational coupling recess also ensure that the intermediate plate enters into frictional interaction with the housing arrangement upon execution of axial movements. The frictional interaction counteracts the buildup of vibrations in the area of the intermediate plate. The pressure plate assembly according to the present invention avoids the suspension of the intermediate plate according to the state of the art by means of tangential leaf springs, which is essentially free in the axial direction.

At least one contact surface extending essentially in the same direction as the axis of rotation may be provided on the rotational coupling recess, along which surface the minimum of one rotational coupling projection is able to shift upon execution of a releasing movement of the intermediate plate.

For technical reasons associated with production, it is preferable for the minimum of one rotational coupling projection to be located on the intermediate plate.

The intermediate plate releasing force-generating arrangement may comprise at least one leaf spring element extending approximately in the circumferential direction to provide the releasing force or pretensioning force for the intermediate plate which provides a simple design that is reliable in operation. To generate the pretensioning force, the at least one leaf spring element has a first support area by which it is supported relative to the housing arrangement along the direction of the axis of rotation of the pressure plate assembly and a second support area by which it is supported with respect to the intermediate plate along the direction of the axis of rotation. Accordingly, the releasing force may be generated by at least one leaf spring element as disclosed in the prior art. The freedom of the at least one leaf spring to move in the circumferential direction with respect to the intermediate plate and/or with respect to the housing arrangement according to the present invention makes it impossible for any torque to be transmitted via the at least one leaf spring element. That is, at least one of the support areas of the at least one leaf spring element is able to move essentially in the circumferential direction with respect to the one of the intermediate plate or the housing arrangement on which it is supported. The first support area of the at least one leaf spring element is preferably attached to the housing arrangement such as, for example, by riveting. The intermediate plate releasing force-generating arrangement may also comprise at least one group of leaf spring elements.

According to another embodiment of the present invention, a pressure plate releasing force-generating arrangement may include at least one leaf spring element with a first support area supported relative to the housing arrangement along the direction of the axis of rotation and with a second support area supported relative to the pressure plate along the direction of the axis of rotation.

A defined release distance for the intermediate plate may be provided, for example, in that the at least one sensing element is supported approximately in a central area between the first support area and the second support area of the minimum of one leaf spring element of the pressure plate releasing force-generating arrangement or of the contact element connected thereto for movement in common.

The present invention also relates to a multi-disk friction clutch equipped with the pressure plate assembly according to the present invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
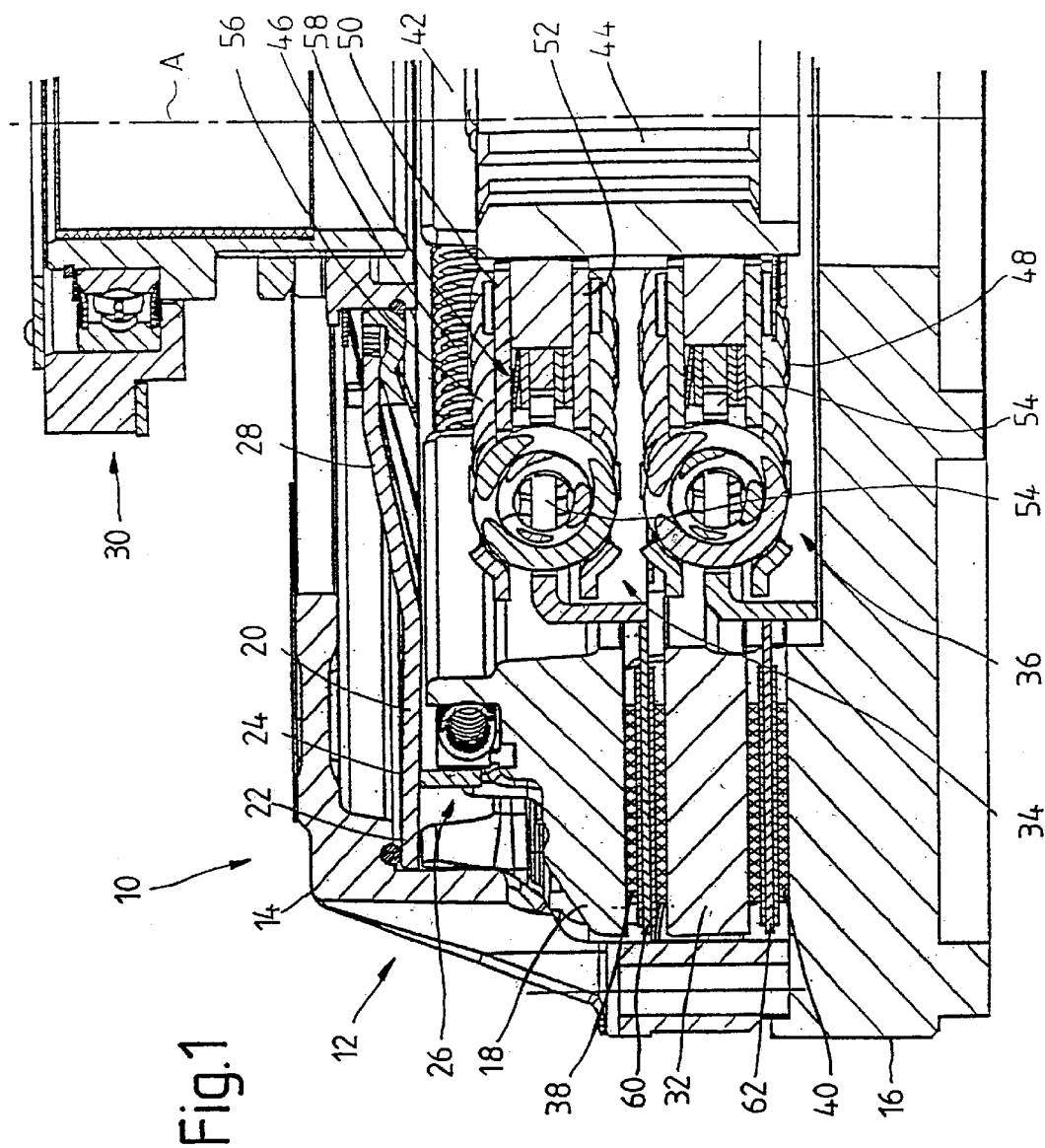
FIG. 1 is a partial longitudinal sectional view through a multi-disk friction clutch according to an embodiment of the present invention.

FIGS. 1–4 show an embodiment of a friction clutch 10 in which the present invention may be implemented. The friction clutch 10 comprises a pressure plate assembly 12 with a housing 14, the radially outer area of which is connected to or connectable to a flywheel 16. The flywheel 16 may be designed as single mass or a multi-mass flywheel. The radially inner area of the flywheel 16 is designed so that it is nonrotatably connectable to a drive shaft, such as a crankshaft of an internal combustion engine.

The pressure plate assembly 12 also includes a pressure plate 18, which is essentially nonrotatably connected to the housing 14 such as, for example, by a plurality of tangential leaf springs, but is axially movable with respect to the housing 14 within a limited axial range in the direction of an axis of rotation A. The radially outer area 22 of a stored-energy device 20 such as, for example, a diaphragm spring is supported on the housing 14. An area 24 of the stored energy device located farther inward in the radial direction acts on the pressure plate 18 through a wear-compensating device 26, which is described in greater detail further below. A release mechanism 30 for executing pull-type disengaging processes acts on spring tongues 28 located radially on the inside of the stored-energy device 20.

The pressure plate assembly 12 also includes an intermediate plate 32. The housing 14 is also connected to the intermediate plate 32 such that the intermediate plate is fixed with respect to rotation relative to the housing and is free to move within a certain axial range.

The pressure plate assembly 12 of the friction clutch 10 further includes two clutch disks 34, 36. Each of these clutch disks 34, 36 has a friction lining 38, 40 in the radially outer area. A hub 42 is connected to the radially inner area of the clutch disks 34, 36. The hub 42 includes wedge-like teeth 44 which are nonrotatably connectable on a power takeoff shaft, such as a transmission input shaft.

Each of the two clutch disks 34, 36 also has a torsional vibration damping arrangement 46, 48. The two torsional vibration damping arrangements 46, 48 are similarly designed in the embodiment presented here and only the torsional vibration damping arrangement 46 of the clutch disk 34 will be described in the following. The torsional vibration damping arrangement 46 includes two cover disk elements 50, 52, the radially inner areas of which are connected to the hub 42 for rotation in common therewith, either directly or via an additional predamper stage. The two cover disk elements 50, 52 may, for example, have internal teeth which mesh with corresponding external teeth on the hub 42. Axially between the two cover disk elements 50, 52 is a central disk element 54. Both the cover disk elements 50, 52 and the central disk element 54 have spring windows with control edges in the circumferential direction, on each of which the end of a damper spring 56 is supported in the circumferential direction. Several damper springs 56 in a row in the circumferential direction or groups of damper springs 56 nested radially inside each other may be provided as is generally known in and of itself for torsional vibration damper arrangements normally provided for clutch disks. The damper springs 56 allow a limited circumferential mobility of the central disk element 54 with respect to the associated cover disk elements 50, 52. A stop for limiting rotational movement may be provided to prevent the damper springs 56 from being fully compressed. In addition, a dry friction device 58 may also be provided to contribute by Coulomb friction to the vibration damping above and beyond the damping effect provided by compression of the springs. As mentioned above, the torsional vibration damping arrangements 46, 48 may be designed with several stages such as, for example, by providing an additional set of cover disk elements axially farther toward the outside and an associated set of springs which act between the cover disk elements 50, 52 and the additional cover disk elements.

The radially outer area of each of the central disk elements 54 of the two clutch disks 34, 36 carry disk-like friction lining carriers 60, 62 which carry the friction linings 38, 40 via associated leaf springs. Alternatively, the friction lining carriers 60, 62 may themselves be the spring linings.

In the engaged state, the stored-energy device 20 presses down via the previously mentioned wear-compensating device 26 on the pressure plate 18. This presses the friction linings 38 of the clutch disk 34 against the intermediate plate 32. The clutch disk 36 with its friction linings 40 may then be clamped between the intermediate plate 32 and the flywheel 16. As a result of this friction-locking connection, a nonrotatable connection is established between a first side of the clutch comprising the pressure plate 18, the intermediate plate 32, and the flywheel 16 and a second side of the clutch comprising the two clutch disks 34, 36 on the common hub 42. For the transition to the disengaged state, a pulling force is exerted on the spring tongues 28 of the stored-energy device 20. This moves area 24 of the stored-energy device 20 axially away from the flywheel 16, thereby releasing at least some of the force exerted by the stored-energy device 20 from the pressure plate 18. Under the action of the previously mentioned tangential leaf springs, the pressure plate 18 and the intermediate plate 32 are then also moved axially away from the flywheel 16 to release the clamping action and the two clutch disks 34, 36.

Figure 2:
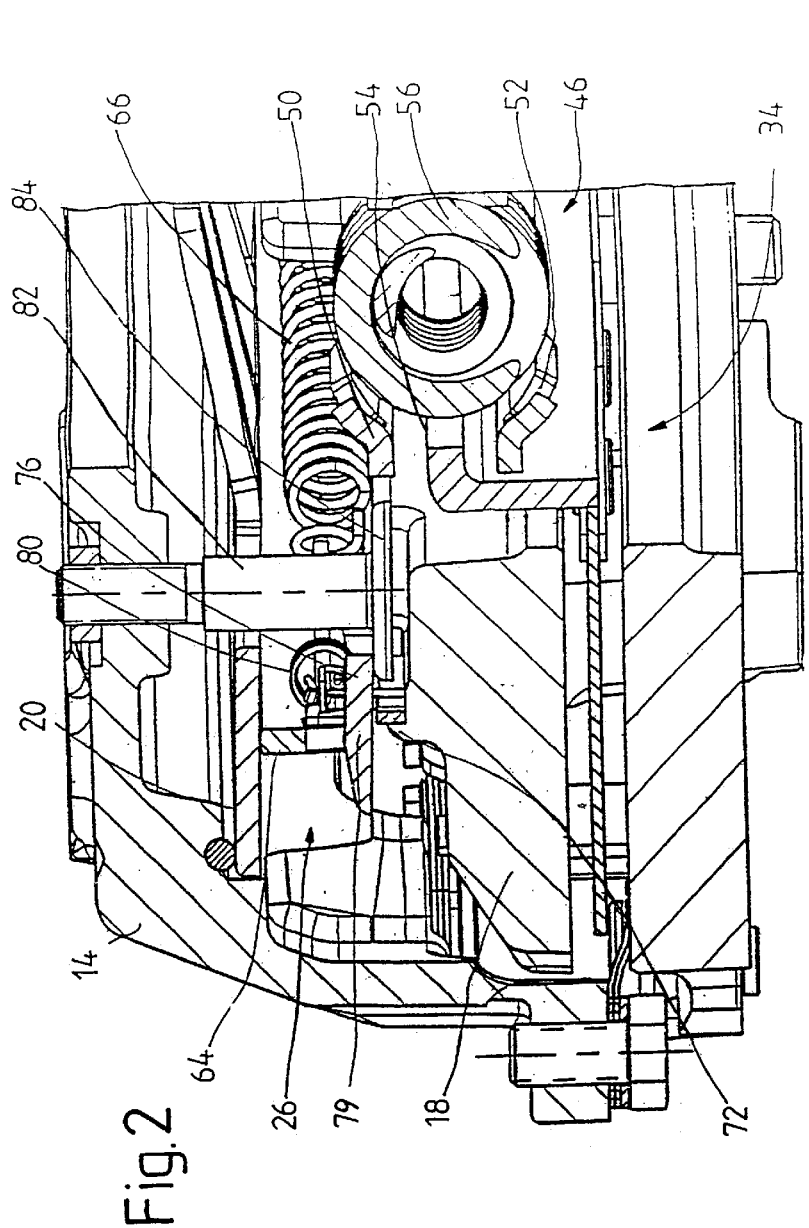
FIG. 2 is a partial longitudinal sectional view through the pressure plate assembly for the multi-disk friction clutch shown in FIG. 1.
Figure 3:
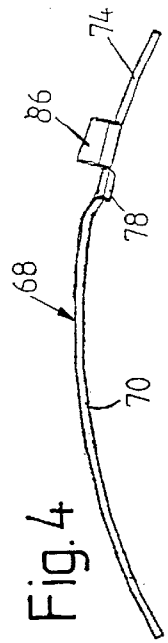
FIG. 3 is a side view of a slider used in the pressure plate assembly of FIG. 2.

In the following, the design and function of the wear-compensating device 26 is described with reference to FIGS. 2–4.

The wear-compensating device 26 comprises an adjusting 64 ring. The stored-energy device 20 acts on one axial side of the adjusting ring 64. The other axial side of the adjusting ring 64 has several inclined ramp or wedge surfaces arranged in succession in the circumferential direction such that the height of these ramps changes in the circumferential direction. Axially opposing these surfaces are corresponding surfaces of the pressure plate 18. A rotation of the adjusting ring 64 causes the surface of the ring acted on by the stored-energy device 20 to change its axial height from the pressure plate 18. The pretensioning spring 66 which may, for example, comprise a helical tension spring urges the adjusting ring 64 in rotational movement around the axis of rotation A with respect to the pressure plate 18 in a direction such that the surface acted on by the stored-energy device 20 moves away from the pressure plate 18 upon release of the adjusting ring 64. For this purpose, one end of the pretensioning spring 66 is held in place on the pressure plate 18 and the other end of the pretensioning spring 66 is held on the adjusting ring 64.

The wear-compensating device 26 also includes a wedge-like slider 68 which has a curvature that conforms to the curved contour of the adjusting ring 64. A longitudinal section 70 of the slider 68 rests against an inner circumferential area of an axial shoulder 72 on the pressure plate 18. The slider 68 is designed to slide in the circumferential direction. One end of a leaf-like arresting element 76 is fixed in place at one end on the pressure plate 18. The other circumferential end area 79 of the arresting element 76 extends over the wedge-like elongated area 70 of the wedge-like slider 68. Accordingly, the arresting element 76 presses on the slider 68 and thus pushes it against the pressure plate 18. One end of another pretensioning spring 80 is hooked onto a hook section 78 of the slider 68. The other end of the pretensioning spring 80 is hooked onto the end of the spring 66 that is hooked onto the adjusting ring 64. The pretensioning spring 80 urges the slider 68 to slide in a circumferential direction which causes the increasingly larger axial dimension of the slider to fill up the area between the pressure plate 18 and the end area 79 of the arresting element 76. However, the end area 79 of the arresting element 76 which is pretensioned against the pressure plate 18 prevents the slider 68 from executing this type of sliding movement in the circumferential direction.

Figure 4:
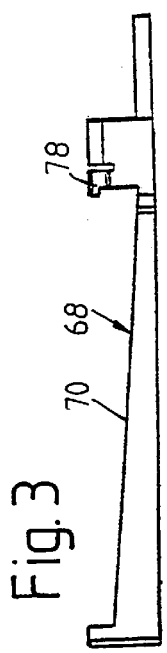
FIG. 4 is a top view of the slider of FIG. 3.

As shown in FIG. 4, the slider 70 has a blocking section 86 which is bent radially outward so that the blocking section 86 extends radially outward to engage in an associated circumferential opening in the adjusting ring 64. The circumferential opening, which cannot be seen in the drawings, has a larger circumferential dimension than the blocking section 86. Accordingly, the blocking section 86 has a certain limited freedom to move circumferentially in this circumferential opening of the adjusting ring 64.

A stop element 82 is arranged on the housing 14 and is radially inside the adjusting ring 64 and near the end area 79 of the arresting element 76. The stop 82 may comprise a threaded bolt which threadably inserted into a corresponding threaded hole in the housing 14 and a mushroom-like head 84 which projects into the space formed between the arresting clement 76 and the pressure plate 18.

The operation of the wear-compensating device 26 upon the occurrence of wear, that is, upon abrasion of the friction linings 38, 40, is described below.

The friction linings 38, 40 of the friction clutch 10 are subjected to heavy stress during the execution of clutch-engaging operations, thereby causing abrasion or wear of the friction linings 38, 40. The intermediate plate 32 and the pressure plate 18 are moved closer to the flywheel 16 as a result of the wear of the friction linings. The stored-energy device 20 basically follows the movement of the intermediate plate 32 and the pressure plate 18 by changing its installation position correspondingly when in the engaged state. Once the wear of the friction linings 38, 40 reaches a certain extent, the end area 79 of the arresting element 76 contacts the mushroom-shaped head 84 of the stop element 82. As further wear occurs, the pressure plate 18 continues to move toward the flywheel 16 while the end area 79 of the arresting element 76 remains hanging on the stop element 82. That is, the end area 79 of the arresting element 76 no longer follows along after the displacement of the pressure plate 18. The intermediate space formed between the arresting element 76 and the pressure plate 18 and filled up by the wedge-like section 70 of the slider 68 increases. The enlargement of this space allows the slider 68 to move slightly in the circumferential direction under the urgency of the spring 80. The displacement of the slider 68 in the circumferential direction corresponds to the amount of wear. This displacement of the slider 68 in the circumferential direction is possible because the blocking section 86 has a certain circumferential play in the previously mentioned opening in the adjusting ring 64. Upon the occurrence of wear, only a certain part of the arresting element 76 will be able to move axially with respect to the pressure plate 18 while the end area 79 is prevented from following the pressure plate 18 by the head 84 of the stop element. The slider 68 will also move to a certain extent in the circumferential direction allowed by the end area 79 of the arresting element 76. The pretensioning spring 80 thus relaxes slightly upon movement of the slider 68 in response to wear. In the engaged state of the friction clutch 10, the adjusting ring 64 is acted on by the stored-energy device 20 which prevents the ring from rotating circumferentially with respect to the pressure plate 18. The adjusting ring 64 is moved under the urgency of the pretensioning spring 66 only upon the performance of a release operation, i.e., after a release of the force of the stored-energy device 20 on the adjusting ring 64 in response to the above-mentioned pulling action. The adjusting ring 64 is moved only until the blocking section 86 contacts one of the ends of the circumferential opening in the adjusting ring 64. The contact force of the adjusting ring 64 on the stored-energy device 20 is defined essentially only by the previously mentioned tangential leaf springs, which also provide the release force. Since the circumferential movement of the slider 68 already corresponds with the wear which has occurred, the rotational movement of the adjusting ring 64 upon execution of a release operation also corresponds to the wear which has occurred. Upon this rotational movement of the adjusting spring 64, the pretensioning spring 66 relaxes slightly and the pretensioning spring 80 is tensioned again somewhat more strongly. Accordingly, the pretensioning force applied by the spring 66 is required to be greater than the pretensioning force applied by the spring 80.

As a result of the rotation of the adjusting ring 64 in the disengaged state upon the occurrence of wear, the surface of the adjusting ring 64 facing the stored-energy device 20 is displaced axially with respect to the pressure plate 18. Accordingly, the entire assembly clamped axially between the stored-energy device 20 and the flywheel 16, which includes the adjusting ring 64, the pressure plate 18, the clutch disk 34 in the area of its friction linings 38, the intermediate plate 32, and the clutch disk 36 in the area of its friction linings 40, thus retains an approximately constant axial dimension regardless of the amount of wear which has occurred. As a result, the stored-energy device 20 also retains approximately the same installed position. The degree of inclination of the elongated, wedge-like area 70 of the slider 68, for example, dictates the degree of compensation. Furthermore, several sliders 68 and their associated arresting elements 76 or stop elements 82 may be distributed around the circumference of the friction clutch 10. However, to implement the previously described wear compensation, a single such slider 68 is sufficient.

Figure 5:
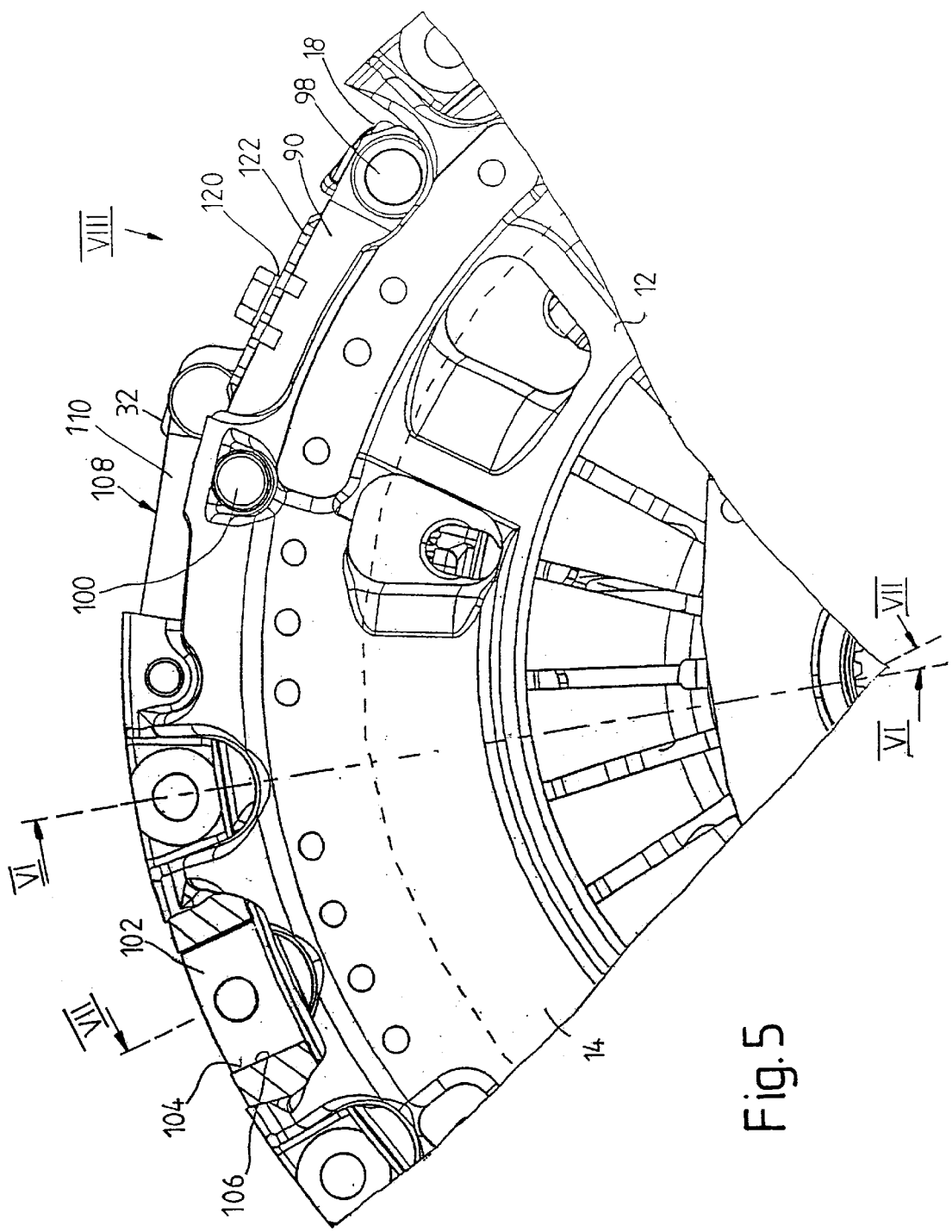
FIG. 5 is a partial axial view of the housing side of the pressure plate assembly shown in FIG. 2.
Figure 8:
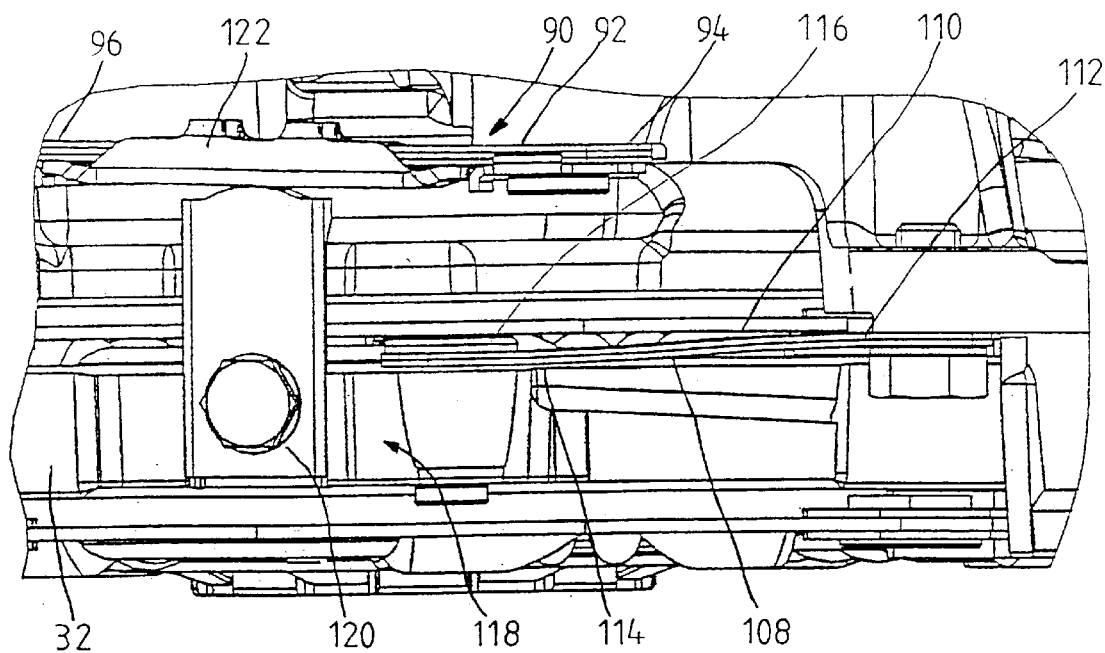
FIG. 8 is a view of the radially outer side of the pressure plate assembly of FIG. 5 looking in direction VIII.
Figure 6:
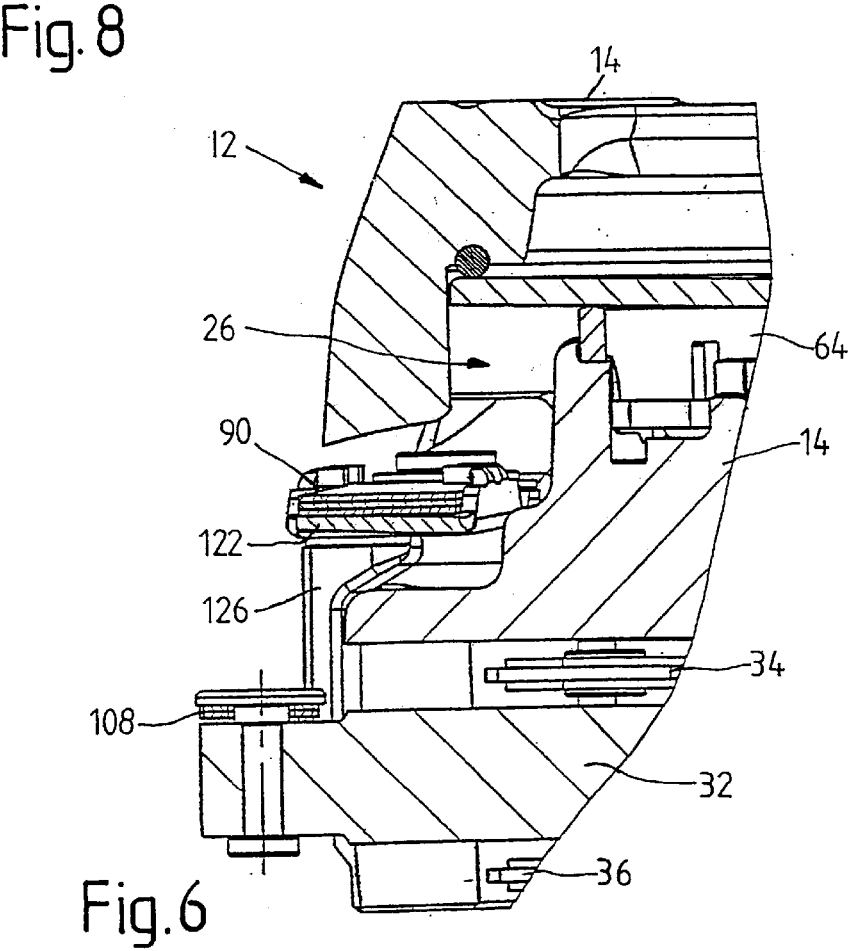
FIG. 6 is a cross sectional view through the pressure plate assembly of FIG. 5 along line VI—VI.
Figure 7:
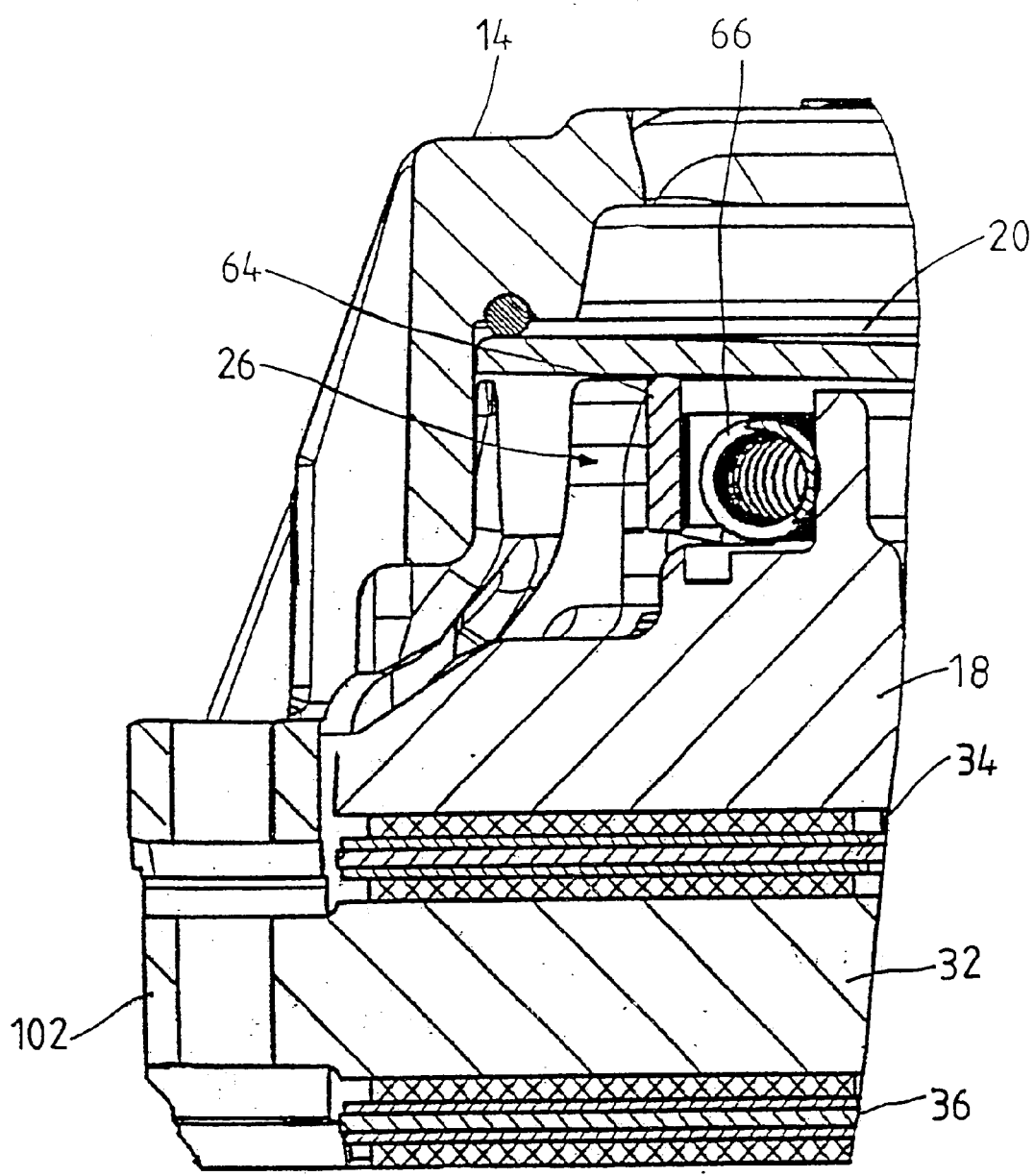
FIG. 7 is a cross sectional view through the pressure plate assembly of FIG. 5 along line VII—VII.

The following is a description of the rotational coupling of the pressure plate 18 to the housing 14 and of the intermediate plate 32 to the housing 14. As shown in FIGS. 5 and 8, the pressure plate 18 is coupled to the housing 14 by several packages 90 of leaf springs distributed around the circumference of the housing 14. The leaf spring packages 90 include, for example, three leaf springs 92, stacked one on top of the other. The three leaf springs 92 extend approximately in the circumferential direction and have end areas 94, 96 being attached to the housing 14 on one side and to the pressure plate 18 on the other by rivets 98, 100. The leaf springs 92 are preshaped such that, by virtue of their support on the housing 14, they exert a force on the pressure plate 18 which urges the pressure plate axially toward the housing 14 and away from the flywheel 16 (see FIG. 1). Simultaneously, these leaf springs 92 or leaf spring packages 90 provide a rotational coupling between the pressure plate 18 and the housing 14. The leaf springs 92 or leaf spring packages 90 are arranged such that, under conditions of normal torque transmission, the leaf springs 92 or leaf spring packages 90 are under tension.

To establish the rotational coupling between the intermediate plate 32 and the housing 14, the intermediate plate 32 has radially outward-projecting rotational coupling projections 102 at several positions around its circumference. These engage preferably with only a small amount of play in the circumferential direction in individually assigned rotational coupling recesses 104 in the housing 14. A contact surface 106 is formed at one or both of the circumferential ends of the rotational coupling recess 104, the contact surface 106 extending approximately in the same direction as the axis of rotation A. Upon the execution of a release movement, during which the intermediate plate 32 shifts position in the same direction as the axis of rotation A, the rotational coupling projection 102 or each of the rotational coupling projections 102 moves along the assigned contact surface 106 to produce a corresponding frictional force.

The intermediate plate 32 is also coupled by several groups or packages 108 of leaf spring elements 110 to the housing 14. The packages 108 of leaf spring elements 110 provide the required releasing force for the intermediate plate 32 to ensure that the intermediate plate 32 moves away from the flywheel 16 and thus also away from the clutch disk 36 during a disengaging operation. The leaf spring packages 108 or leaf spring elements 110 as shown, for example, in FIG. 8 are attached at one end 112 to the housing 14 by suitable connectors such as, for example, screws or rivets. The leaf spring elements 110 then extend approximately in the circumferential direction and the other ends 114 of the leaf spring elements 110 are connected to the intermediate plate 32. The leaf spring elements 110 are not fixedly attached to the intermediate plate in the circumferential direction. Instead, the leaf springs 110 have, for example, slot-like through-openings which may be open on one side and extend in the longitudinal direction of the leaf spring elements 110. A fastening bolt on the intermediate plate 32 passes through these openings such that the ends 114 of the leaf spring packages 108 have a small amount of axial play with respect to the intermediate plate 32. Accordingly, the ends 114 are able to move approximately in the circumferential direction with respect to the intermediate plate 32. This freedom of relative movement is required because the intermediate plate 32 is coupled to the housing 14 by the rotational coupling projections 102 discussed above. Therefore, a circumferential yielding movement demanded by the corresponding deformation of the leaf springs 108 would not otherwise be possible. According to the present invention, the freedom of the leaf springs 108 to move in the circumferential direction in at least one of their end areas allows the springs to undergo deformation upon execution of a releasing movement of the intermediate plate 32. Of course, the circumferential freedom could also or alternatively be provided in the end area 112.

A releasing distance preset arrangement 118 is provided to ensure that the intermediate plate 32 executes a defined release stroke which produces a gap between intermediate plate 32 and the clutch disk 36 and a gap between the intermediate plate and the clutch disk 34. The releasing distance preset arrangement comprises sensing elements 120 preferably attached at several points around the circumference of the intermediate plate 32. Each of the sensing elements 120 is positioned to be approximately in the middle of a leaf spring package 90 relative to the circumferential direction as shown in FIG. 8. A contact element 122 may be assigned to the leaf spring package 90, which extends approximately in the same direction as the leaf springs 92 of the leaf spring package 90 and which is held on the leaf spring package 90 with freedom of movement at its two circumferential ends near the end areas 94, 96 of the leaf springs 92. The sensing element 120 is supported axially on the contact element 122 under the preload of the leaf spring package 110. Upon execution of a disengaging operation and the corresponding axial displacement of the pressure plate 18, the end area 96 of the leaf spring package 90 (see FIG. 8) will move upward toward the housing 14. The other end area 94 is held in place relative to the housing 14. Accordingly, the leaf springs 92 are inclined or slanted from the pressure plate 18 to the housing 14 in the area between the two ends 94, 96. The contact element 122 assigned to the leaf spring package 90 is correspondingly inclined. As a result of the above-described sensing function, the associated sensing element 120 acquires the ability to move in the axial direction by a distance equal to half of the disengaging movement of the pressure plate 18. The intermediate plate 32, which is rigidly connected to the sensing element or elements 120, moves in the axial direction by a distance equal to half the stroke of the pressure plate 18. Accordingly, the gap between the intermediate plate 32 and the flywheel 16 increases during a releasing operation along with the gap between the intermediate plate 32 and the pressure plate 18. This ensures that the two clutch disks 34, 36 are set flee and the clutch is brought into a disengaged state which is essentially free of friction.

According to the present invention, the separation between the rotational coupling function of the intermediate plate and the housing and the releasing force production function for the intermediate plate allows the assemblies provided or to be provided for these purposes to be adapted in optimal fashion to the specific requirements of each intended function. More specifically, the danger that vibrations will be excited at the intermediate plate as a result of frictional contact between the intermediate plate and the housing during the execution of releasing movements is minimized. The releasing force for the intermediate plate may also be produced by other spring elements such as by helical compression or helical tension springs and hairpin springs. Furthermore, different types of releasing force-generating elements for the pressure plate may be used in which case other measures would then have to be taken to ensure a defined releasing movement of the intermediate plate.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure plate assembly for a multi-disk clutch, comprising:

a housing arrangement rotatable about an axis of rotation;

a pressure plate connected to said housing arrangement such that said pressure plate is fixed with respect to rotation relative to said housing and axially movable relative to said housing in a release movement direction;

an assembly connected relative to said pressure plate so that said assembly shifts position during a release movement of said pressure plate in the release movement direction;

an intermediate plate connected to said housing arrangement such that said intermediate plate is fixed with respect to rotation relative to said housing and axially movable relative to said housing in the release movement direction;

a releasing distance preset arrangement for ensuring movement of said intermediate plate in the release direction in response to the release movement of said pressure plate, said releasing distance preset arrangement comprising at least one sensing element arranged on said intermediate plate, and a release force-generating arrangement acting on said intermediate plate for urging said intermediate plate in the release movement direction and pretensioning said at least one sensing element on said assembly; and at least one rotational coupling projection mounted on one of said intermediate plate and said housing arrangement and engaging in a rotational coupling recess in the other of said intermediate plate and said housing arrangement for producing a rotational coupling between said intermediate plate and said housing arrangement.

2. The pressure plate assembly of claim 1, wherein said rotational coupling recess defines at least one contact surface extending in the direction of the axis of rotation, wherein said at least one rotational coupling projection shifts position along the contact surface during movement by said intermediate plate in the release movement direction.

3. The pressure plate assembly of claim 2, wherein said at least one rotational coupling projection is mounted on said intermediate plate.

4. The pressure plate assembly of claim 1, wherein said at least one rotational coupling projection is mounted on said intermediate plate.

5. The pressure plate assembly of claim 1, wherein said intermediate plate release force-generating arrangement comprises at least one leaf spring element extending approximately in a circumferential direction and having a first support area supported relative to the housing arrangement in the direction of the axis of rotation and a second support area supported relative to said intermediate plate in the direction of the axis of rotation such that said at least one leaf spring element produces a pretensioning effect.

6. The pressure plate assembly of claim 5, wherein at least one of said first and second support areas of said at least one leaf spring element is movable relative to the one of said intermediate plate and said housing arrangement on which it is supported.

7. The pressure plate assembly of claim 6, wherein said first support area of said at least one leaf spring element is fixed in position on said housing arrangement.

8. The pressure plate assembly of claim 7, wherein said first support area of said at least one leaf spring is fixed to said housing arrangement by a rivet.

9. The pressure plate assembly of claim 5, wherein said intermediate plate release force-generating arrangement comprises at least one group of leaf spring elements.

10. The pressure plate assembly of claim 1, wherein said assembly comprises a pressure plate release force-generating arrangement having at least one leaf spring element with a first support area supported relative to said housing arrangement along the direction of the axis of rotation and a second support area supported relative to the pressure plate in the direction of the axis of rotation.

11. The pressure plate assembly of claim 10, wherein said at least one sensing element is supported approximately in a central position of said at least one leaf spring element of said pressure plate release force-generating arrangement between said first and second support areas.

12. The pressure plate assembly of claim 10, further comprising a contact element connected to said at least one leaf spring element for motion in common therewith, wherein said at least one sensing element is supported on said contact element approximately in a central position of said at least one leaf spring element between said first and second support areas.

13. The pressure plate assembly of claim 5, wherein said assembly comprises a pressure plate release force-generating arrangement having at least one leaf spring element with a first support area supported relative to said housing arrangement along the direction of the axis of rotation and a second support area supported relative to the pressure plate in the direction of the axis of rotation.

14. The pressure plate assembly of claim 13, wherein said at least one sensing element is supported approximately in a central position of said at least one leaf spring element of said pressure plate release force-generating arrangement between said first and second support areas.

15. The pressure plate assembly of claim 13, further comprising a contact element connected to said at least one leaf spring element for motion in common therewith, wherein said at least one sensing element is supported on said contact element approximately in a central position of said at least one leaf spring element between said first and second support areas.

16. A multi-disk friction clutch comprising a pressure plate assembly, said pressure plate assembly comprising:

a housing arrangement rotatable about an axis of rotation;

a pressure plate connected to said housing arrangement such that said pressure plate is fixed with respect to rotation relative to said housing and axially movable relative to said housing in a release movement direction;

an assembly connected relative to said pressure plate so that said assembly shifts position during a release movement of said pressure plate in the release movement direction;

an intermediate plate connected to said housing arrangement such that said intermediate plate is fixed with respect to rotation relative to said housing and axially movable relative to said housing in the release movement direction;

a releasing distance preset arrangement for ensuring movement of said intermediate plate in the release direction in response to the release movement of said pressure plate, said releasing distance preset arrangement comprising at least one sensing element arranged on said intermediate plate, and a release force-generating arrangement acting on said intermediate plate for urging said intermediate plate in the release movement direction and pretensioning said at least one sensing element on said assembly; and at least one rotational coupling projection mounted on one of said intermediate plate and said housing arrangement and engaged in a rotational coupling recess in the other of said intermediate plate and said housing arrangement for producing a rotational coupling between said intermediate plate and said housing arrangement.

* * * * *